United States Patent
Takigawa et al.

(10) Patent No.: US 6,217,753 B1
(45) Date of Patent: Apr. 17, 2001

(54) APPARATUS FOR REGULATING FLOW OF WATER INTO WATER PURIFIER RESPONSIVE TO DOWNSTREAM PRESSURE SENSOR

(75) Inventors: Satoshi Takigawa, Konosu; Toshiya Chiku, Isesaki, both of (JP)

(73) Assignee: Sanden Corporation (JP)

( * ) Notice: Subject to any disclaimer, the term of this patent is extended or adjusted under 35 U.S.C. 154(b) by 0 days.

(21) Appl. No.: 08/812,477

(22) Filed: Mar. 6, 1997

(30) Foreign Application Priority Data

Mar. 7, 1996 (JP) .................................................. 8-049778

(51) Int. Cl.⁷ .......................... B01D 17/12; B01D 24/40; F16K 31/00; C02F 1/46
(52) U.S. Cl. ..................... 210/90; 137/487.5; 137/488; 210/106; 210/110; 210/120; 210/243
(58) Field of Search .............................. 210/85, 90, 96.2, 210/97, 110, 134, 136, 143, 257, 257.2, 269, 436, 472, 670, 792, 106, 107, 120, 175, 243; 502/20, 56; 137/2, 487.5, 488; 222/14, 53, 59, 141.6, 189.06

(56) References Cited

U.S. PATENT DOCUMENTS

| | | | |
|---|---|---|---|
| 662,632 | * | 11/1900 | Vail . |
| 3,730,885 | * | 5/1973 | Makrides et al. ..................... 210/670 |
| 4,801,375 | * | 1/1989 | Padilla ................................. 210/110 |
| 5,254,243 | * | 10/1993 | Carr et al. ............................ 210/110 |
| 5,494,573 | * | 2/1996 | Schoenmeyr et al. ............ 210/257.2 |

FOREIGN PATENT DOCUMENTS

| | | | |
|---|---|---|---|
| 2659869 | * | 9/1991 | (FR) ..................................... 210/670 |
| 2-90988 | | 3/1990 | (JP) . |
| 2-207883 | | 8/1990 | (JP) . |

* cited by examiner

Primary Examiner—Joseph W. Drodge
(74) Attorney, Agent, or Firm—Banner & Witcoff, Ltd.

(57) ABSTRACT

A water purifier generally associated with a beverage dispenser is disclosed. The water purifier includes a conduit having a first end and a second end opposite to the first end, and a water purifying device disposed in the conduit between the first and second ends thereof. The first end of the conduit is arranged to conduct water to be purified into the conduit, and the second end of the conduit is arranged to conduct the purified water from the conduit to a location outside of the water purifier. A flow of the water through the conduit is completely prohibited by the cooperative operations of a pressure detector at the second end of the conduit and an electromagnetic valve at the first end of the conduit at a time when the water attempts to flow through the conduit from the second end to the first end.

7 Claims, 1 Drawing Sheet

APPARATUS FOR REGULATING FLOW OF WATER INTO WATER PURIFIER RESPONSIVE TO DOWNSTREAM PRESSURE SENSOR

BACKGROUND OF THE INVENTION

1. Technical Field of the Invention

This invention generally relates to a water purifier, and more particularly, to a water purifier for a beverage dispenser or other beverage serving apparatus.

2. Description of the Prior Art

In general, a beverage dispenser is connected to a faucet of a water pipe so as to conduct treated water suitable for drining, for example, a chlorinated water, from the water pipe through a pipe member and to the beverage dispenser.

Since it is demanded that the water which will be conducted into the beverage dispenser be clear and harmless, it is required to remove detrimental substances, such as for example, trihalomethane ($CHX_3$) and offensive odor substances, such as for example, 2-MIB, and minute particles, such as for example, Fe system substances coming off from an inner wall of the water pipe, from the water which will be conducted into the beverage dispenser. Accordingly, it is preferable to dispose a water purifier within the pipe member which links the faucet of the water pipe to the beverage dispenser.

However, conventional water purifiers may allow water to flow from the beverage dispenser to the water pipe. Therefore, pollutants, such as for example, the germs which are unexpectedly propagated at the beverage dispenser, may be unintentionally conducted to the water pipe through the pipe member together with the water when it is allowed to erroneously flow from the beverage dispenser to the water pipe.

SUMMARY OF THE INVENTION

Accordingly, it is an object of the present invention to provide a water purifier which can completely prohibit water from flowing therethrough at a time when the water may attempt to erroneously flow backwardly through the water purifier.

According to the present invention, an apparatus for processing water includes a conduit having a first end and a second end opposite to the first end, and a water processing mechanism, such as a water purifying device. The water purifying device is disposed in the conduit between the first and second ends thereof.

The first end of the conduit is arranged to conduct an object water to be processed into the conduit. The second end of the conduit is arranged to conduct the water processed at the water purifying device to a location outside of the apparatus.

The water processing apparatus further comprises a prohibiting mechanism for prohibiting a flow of the water through the conduit at a time when the water may attempt to flow through the conduit from the second end to the first end.

The prohibiting mechanism comprises a detector, such as a pressure detector, for detecting whether the processed water is required to be conducted to the location outside of the apparatus through the second end of the conduit and a regulating device, such as an electromagnetic valve, for regulating the conducting of the object water into the conduit through the first end thereof in response to a detecting result from the pressure detector.

The regulating device is arranged such that it operates to close the first end of the conduit at a time when the pressure detector detects that the processed water is not required to be conducted to the location outside of the apparatus through the second end of the conduit.

BRIEF DESCRIPTION OF THE DRAWINGS

The novel features of the present invention are set out with particularity in the appended claims, but the invention will be understood more fully and clearly from the following detailed description of the invention as set forth in the accompanying drawings.

The single drawing is a block diagram of a water purifier in accordance with one embodiment of the present invention.

DETAILED DESCRIPTION OF THE PREFERRED EMBODIMENTS

Figure 1:
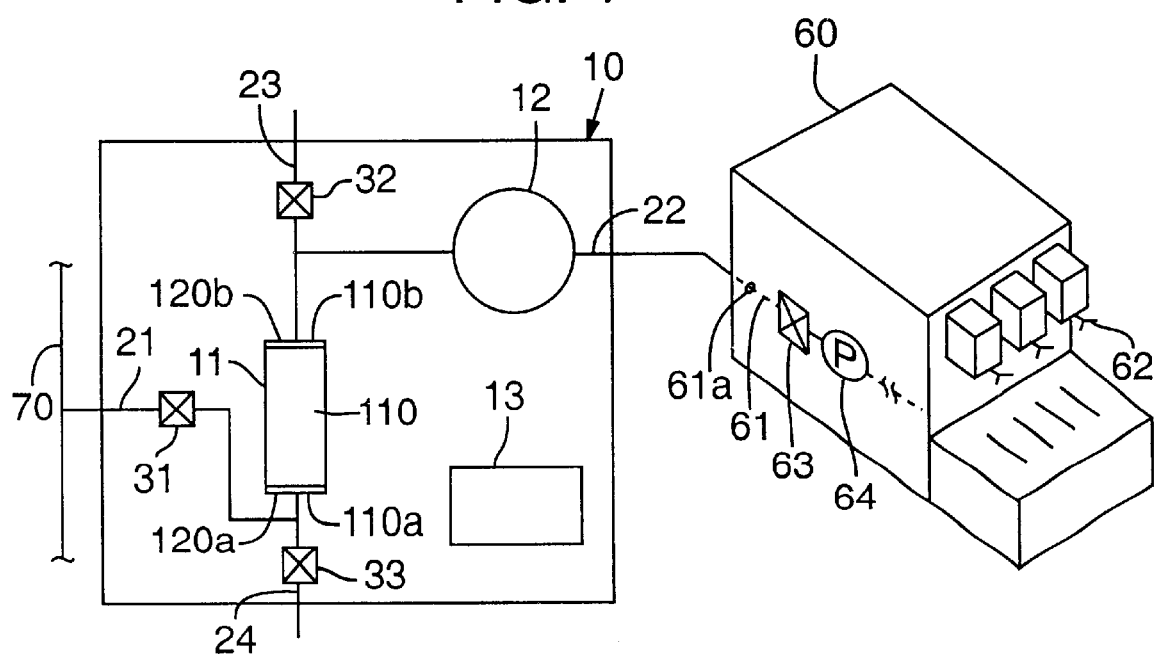

With reference to the drawing illustrating a block diagram of a water purifier in accordance with one embodiment of the present invention, the water purifier 10 includes a reactivatable water purifying device 11.

The water purifying device 11 includes a container 110 which contains a purifying member (not shown) therewithin. The purifying member comprises active carbon particles (not shown) functioning as both adsorbing and filtrating elements. The container 110 has first and second ends 110a and 110b opposite to each other. The water purifying device 11 is oriented such that the first end 110a is lower than the second end 110b when it is installed. A pair of electrodes 120a and 120b are fixedly disposed at the first and second ends 110a and 110b of the container 110, respectively, so as to face each other while the water is properly flowing through the container 110.

A first pipe member 21 is disposed between the water purifying device 11 and a water pipe 70 which is conducting a treated water suitable for drinking, for example, a chlorinated city water therethrough. One end of the first pipe member 21 is releasably connected to a faucet (not shown) of the water pipe 70, and the other end is connected to the first end 110a of the container 110 of the water purifying device 11. A first valve element 31, for example, a first electromagnetic valve having a normally closed contact (not shown) is disposed within the first pipe member 21.

A second pipe member 22 is disposed between the container 110 of the purifying device 11 and a beverage serving apparatus 60, for example, a tea server, coffee brewing apparatus or the like. One end of the second pipe member 22 is releasably connected to an inlet port 61a of a water conducting pipe 61 (a part of which is illustrated in the drawing) equipped in the beverage serving apparatus 60, and the other end is fixedly connected to the second end 110b of the container 110. A water flow detecting element 12, for example, a pressure detector is disposed within the second pipe member 22.

A plurality of beverage selecting levers 62 are operatively disposed at a front end surface (to the right in the drawing) of the beverage serving apparatus 60. The levers 62 are operatively connected to a single valve element, for example, an electromagnetic valve 63 having a normally closed contact (not shown), such that the electromagnetic valve 63 is energized and deenergized in response to the movement of the levers 62. The electromagnetic valve 63 is disposed within the water conducting pipe 61 of the beverage serving apparatus 60. A pump 64 is also disposed within the water conducting pipe 61, and is positioned to be farther than the electromagnetic valve 63 from the inlet port 61a of the water conducting pipe 61.

A third pipe member 23 functioning as an air outlet pipe is connected at one end to the second pipe member 22 at a location between the pressure detector 12 and the second end 110b of the container 110 of the purifying device 11. The other end of the third pipe member 23 is open to the atmosphere. A second valve element 32, for example, a second electromagnetic valve is disposed within the third pipe member 23.

A fourth pipe member 24 functioning as a water outlet pipe is connected at one end thereof to the first pipe member 21 at a location between the first valve element 31 and the first end 110a of the container 110 of the purifying device 11. The other end of the fourth pipe member 24 is open to the atmosphere. A third valve element 33, for example, a third electromagnetic valve is disposed within the fourth pipe member 24.

The first through third valve elements 31–33 and the pressure detector 12 are electrically connected to a control device 13 so as to be controlled independently.

In operation of the water purifier 10, as the beverage serving apparatus 60 is required to serve one of the kinds of beverages therefrom, the corresponding selecting lever 62 of the beverage serving apparatus 60 is pushed rearwardly (to the left in the drawing), and the electromagnetic valve 63 is energized to be open, and simultaneously, the pump 64 begins to operate. As a result, the water located in the first pipe member 21, from a location after the first electromagnetic valve 31, the water purifying device 11 and within the second pipe member 22, is conducted through the water conducting pipe 61, past the electromagnetic valve 63 and the pump 64 to a decocting portion (not shown) of the beverage serving apparatus 60. At this moment, the flow of the water from the water pipe 70 to the container 110 of the water purifying device 11 is blocked because the first electromagnetic valve 31 is deenergized (i.e., closed). As the water within the first pipe member 21, after the first electromagnetic valve 31, the water purifying device 11 and the second pipe member 22 is continually conducted to the water conducting pipe 61 of the beverage serving apparatus 60, the pressure of the water in the second pipe member 22 gradually decreases.

When the pressure of the water in the second pipe member 22 decreases to a first predetermined value, the pressure detector 12 is turned on, and generates a first electrical signal $S_1$, which is continually sent to the control device 13. Once the control device 13 receives the first electrical signal $S_1$, the control device 13 signals to energize the first electromagnetic valve 31 to an open position. As a result, the water flowing through the water pipe 70 begins to be conducted to the water conducting pipe 61 of the beverage serving apparatus 60 through the first pipe member 21, the water purifying device 11 and the second pipe member 22.

In this stage, the water from the water pipe 70 as an object water flows into the container 110 of the purifying device 11 through the first end 110a of the container 110, and moves upwardly through the container 110 so as to be purified by virtue of both the adsorbing and filtrating operations occurring therewithin. The water purified at the container 110 of the purifying device 11 flows out from the container 110 through the second end 110b, and is conducted through the second pipe member 22 to the water conducting pipe 61 of the beverage serving apparatus 60 as a processed water.

The adsorbing and filtrating operations of the purifying device 11 are described in detail below. In the adsorbing operation, detrimental substances, such as for example, trihalomethane ($CHX_3$) and offensive odor substances, such as for example, 2-MIB are adsorbed by the active carbon particles. However, in this operation, Cl system germicidal substances, such as for example, ClO and $Cl_2$ are also adsorbed by the active carbon particles (not shown). In the filtrating operation, minute particles, such as for example, Fe system substances coming off from an inner wall of the water pipe 70, are suspended in the water therein and are filtrated with the active carbon particles (not shown).

When the service of the beverage from the beverage serving apparatus 60 is completed, the corresponding selecting lever 62 is moved forwardly (to the right in the drawing), and the electromagnetic valve 63 is deenergized to a closed position, and simultaneously, the operation of the pump 64 is terminated.

At this moment, the first electrical signal $S_1$ continues to be sent to the control device 13 so that the first electromagnetic valve 31 is still energized to the open position. Therefore, the water flowing through the water pipe 70 is still conducted through the first pipe member 21, past the first electromagnetic valve 31, through the container 110 of the purifying device 11 and to the second pipe member 22 due to an inner pressure force of the water in the water pipe 70. As a result, the pressure of the water in the second pipe member 22 gradually increases.

When the pressure of the water in the second pipe member 22 increases to a second predetermined value which is less than the inner pressure of the water in the water pipe 70 but is greater than the aforementioned first predetermined value, the pressure detector 12 is turned off, and the generation of the first electrical signal $S_1$ is terminated, so that the first electrical signal $S_1$ is no longer sent to the control device 13. Once the control device 13 does not receive the first electrical signal $S_1$, the control device 13 signals to deenergize the first electromagnetic valve 31 to a closed position. As a result, the flow of the water from the water pipe 70 to the container 110 of the purifying device 11 is stopped, so that the operation of purifying the water at the purifying device 11 is terminated.

As long as the control device 13 does not receive the first electrical signal $S_1$ the control device 13 maintains the signal to the first electromagnetic valve 31 not to energize so that the first electromagnetic valve 31 is maintained in a closed position. Accordingly, the fluid communication between the water pipe 70 and the water purifying device 11 through the first pipe member 21 is blocked by the first electromagnetic valve 31 at any time other than a time when the beverage serving apparatus 60 is required to serve one of the kinds of beverages therefrom.

Furthermore, regardless of whether the operation of the purifying device 11 is carried out, when the water purifying device 11 is determined to need to be reactivated, a reactivating operation of the water purifying device 11 is carried out according to the following manner.

First, the control device 13 signals to open the second and third electromagnetic valves 32 and 33 while the first electromagnetic valve 31 remains in a closed position. Consequently, an inner space of the container 110 of the purifying device 11 becomes in fluid communication with the atmosphere through the third and fourth pipe members 23 and 24. As a result, the water temporarily staying in the container 110 is discharged therefrom. The water flows past the first end 110a of the container 110 and the third electromagnetic valve 33, and is discharged through the fourth pipe member 24 by virtue of its own gravity. At the same time, the air outside container 110 is conducted thereinto through the third pipe member 23, after having past the second electromagnetic valve 32 and the second end 110b of the container 110. Accordingly, the water flows backwardly through the container 110 as compared with the flow of water through the container 110 during a normal operation of the water purifier 10. Due to this backward flow of the water, the substances, such as for example, the Fe system substances coming off from the inner wall of the water pipe 70 that are filtrated with the active carbon articles (not shown), are separated from the active carbon particles and then the substances move downwardly in the container 110 together with the water. Finally, the water is discharged from the container 10 together with the above-mentioned filtrated substances through the fourth pipe member 24.

When the discharge of the water from the container 110 is completed, the control device 13 signals such that an electric potential is loaded on the pair of electrodes 120a and 120b so as to pass the electricity through the active carbon articles, (not shown) in the container 110 in a predetermined time period. As a result, the active carbon particles (not shown) are heated to about 100° C. by means of a Joule effect. When the active carbon particles (not shown) are heated, the detrimental substances, such as for example, trihalomethane ($CHX_3$) and the offensive odor substances, such as for example, 2-MIB are de-adsorbed from the active carbon particles (not shown). In this operational stage, Cl system germicidal substances, such as for example, ClO and $Cl_2$ are also de-adsorbed from the active carbon particles (not shown).

The detrimental substances, such as for example, trihalomethane ($CHX_3$), the offensive odor substances, such as for example, 2MIB, and the Cl system germicidal substances, such as for example, the ClO and $Cl_2$ that are de-adsorbed from the active carbon particles (not shown), are discharged from the container 110 together with the small water droplets which stayed on the active carbon articles (not shown) in the container 110. These substances and small water droplets flow past the first end 110a of the container 110 and the third electromagnetic valve 33 and are discharged through the fourth pipe member 24. As the operation of heating the active carbon articles (not shown) continues after a completion of the discharge of the water from the container 110 to the atmospheric space, the active carbon particles (not shown) and an inner surface of the container 110 are sterilized and dried.

When the operational stage of heating the active carbon particles (not shown) by means of a Joule effect is completed, the control device 13 signals the first and second electromagnetic valves 31 and 32 open while the third electromagnetic valve 33 is signaled to close. Consequently, the fluid communication of the inner space of the container 110 with the atmosphere through the third pipe member 23 is still open while a fluid communication between the water pipe 70 and the container 110 of the water purifying device 11 through the first pipe member 21 also becomes open. As a result, the water flowing through the water pipe 70 is conducted through the first pipe member 21, past the first electromagnetic valve 31 and the first end 110a of the container 110, and into the container 110. As the water continues to be conducted into the container 110 from the water pipe 70, the water level of the container 110 moves toward the second end 110b of the container 110, i.e., the water level of the container 110 moves upwardly while discharging the air in the container 110 past the second end 110b of the container 110 and the second electromagnetic valve 32, and into the atmosphere through the third pipe member 23. After a time when the water level of the container 110 reaches the second end 110b of the container 110, the control device 13 signals the first and second electromagnetic valves 31 and 32 to close while the third electromagnetic valve 33 still remains in the closed position. Thus, the reactivating operation of the water purifying device 11 is completed, and the water purifier 10 becomes on standby for operation thereof.

Furthermore, the reactivating operation of the water purifying device 11 may be arranged by control device 13 to be periodically carried out in predetermined constant time intervals.

Moreover, the reactivating operation of the water purifying device 11 may be arranged to be carried out at a time when the number of times the first electromagnetic valve 31 has opened reaches a predetermined value.

According to one embodiment of the present invention, the fluid communication between the water pipe 70 and the water purifying device 11 through the first pipe member 21 is blocked by the closed first electromagnetic valve 31 at any time other than a time when the beverage serving apparatus 60 is required to serve one of the kinds of beverages therefrom. Therefore, the flow of the water through the water purifier 10 is completely prohibited at any time other than a time when the beverage serving apparatus 60 is required to serve one of the kinds of beverages therefrom. Accordingly, pollutants, such as for example, the germs which are unexpectedly propagated at the beverage serving apparatus 60 are never conducted to the water pipe 70 through the second and first pipe members 22 and 21 together with the water at a time when the water may attempt to erroneously flow from the beverage serving apparatus 60 to the water pipe 70.

This invention has been described in connection with the preferred embodiment. This embodiment, however, is merely for example only and the invention is not restricted thereto. It will be understood by those skilled in the art that variations and modifications can easily be made within the scope of this invention as defined by the appended claims.

We claim:

1. An apparatus for processing water including:
   a conduit having a first end and a second end;
   means for purifying water disposed in said conduit between said first and second ends thereof, said first end of said conduit being arranged to conduct an object water to be purified into said conduit, said second end of said conduit being arranged to conduct the water purified by said water purifying means to a location outside of said apparatus;
   prohibiting means for selectively prohibiting a flow of the water through said conduit from said second end to said first end, said prohibiting means including detecting means including a pressure detector for detecting whether the purified water is required to be conducted to the location outside of said apparatus through said second end of said conduit, wherein said prohibiting means includes regulating means for regulating said object water being and conducted into said conduit through said first end thereof in response to a detecting reuslt of said detecting means.

2. The apparatus of claim 1 wherein said regulating means operates to close said first end of said conduit when said detecting means detects that the purified water is not required to be conducted to the location outside of said apparatus through said second end thereof.

3. The apparatus of claim 2 wherein said pressure detector is disposed in said conduit adjacent to said second end thereof, and said regulating means includes an electromagnetic valve disposed in said conduit adjacent to said first end thereof.

4. The apparatus of claim 1 wherein said water purifying means comprises a reactivable water purifying device.

5. The apparatus of claim 4 wherein said water purifying device includes a container and a plurality of active carbon particles operatively contained in said container.

6. The apparatus of claim 5 wherein said water purifying device further comprises electric potential loading means for loading an electric potential to said active carbon articles so as to heat said active carbon particles in response to demand.

7. The apparatus of claim 6, wherein said water purifying device further includes first and second pipes arranged such that said first pipe conducts the water from said container and the second pipe conducts air from said container during a time when an operation of reactivating said water purifying device is carried out.

* * * * *